(12) United States Patent
Kurashina et al.

(10) Patent No.: US 9,096,940 B2
(45) Date of Patent: Aug. 4, 2015

(54) HIGH PRESSURE WATER ELECTROLYSIS SYSTEM AND METHOD FOR ACTIVATING SAME

(71) Applicant: HONDA MOTOR CO., LTD., Tokyo (JP)

(72) Inventors: Daisuke Kurashina, Wako (JP); Hisashi Nagaoka, Wako (JP); Jun Takeuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 14/037,385

(22) Filed: Sep. 26, 2013

(65) Prior Publication Data

US 2014/0102911 A1 Apr. 17, 2014

(30) Foreign Application Priority Data

Oct. 12, 2012 (JP) ................................. 2012-227079

(51) Int. Cl.
*C25B 1/12* (2006.01)
*C25B 15/02* (2006.01)
*C25B 15/08* (2006.01)

(52) U.S. Cl.
CPC . *C25B 1/12* (2013.01); *C25B 15/02* (2013.01); *C25B 15/08* (2013.01); *Y02E 60/324* (2013.01); *Y02E 60/366* (2013.01); *Y02E 60/521* (2013.01)

(58) Field of Classification Search
CPC .................................. C25B 1/12; C25B 15/02
USPC ....................................................... 204/228.5
See application file for complete search history.

(56) References Cited

U.S. PATENT DOCUMENTS

2012/0255868 A1\* 10/2012 Takeuchi et al. .............. 205/628
2012/0298520 A1\* 11/2012 Takeuchi ...................... 205/335

FOREIGN PATENT DOCUMENTS

JP 2007-100204 4/2007

\* cited by examiner

*Primary Examiner* — Nicholas A Smith
(74) *Attorney, Agent, or Firm* — Mori & Ward, LLP (57) ABSTRACT

A high pressure water electrolysis system includes a high pressure water electrolysis device, a hydrogen storage device, a high pressure hydrogen pipe, a branch pipe, a non-return valve, a pressure detector, and a controller. The controller includes a threshold storage device, a threshold determination device, and a solenoid valve opening/closing operation device. The threshold storage device is configured to store a first threshold of a pressure value detected by the pressure detector and a second threshold lower than the first threshold. The threshold determination device is configured to determine whether or not the pressure value detected by the pressure detector has reached the second threshold. The solenoid valve opening/closing operation device is configured to open and close a solenoid valve if it is determined that the pressure value detected by the pressure detector has reached the second threshold.

8 Claims, 5 Drawing Sheets

HIGH PRESSURE WATER ELECTROLYSIS SYSTEM AND METHOD FOR ACTIVATING SAME

CROSS-REFERENCE TO RELATED APPLICATIONS

The present application claims priority under 35 U.S.C. §119 to Japanese Patent Application No. 2012-227079, filed Oct. 12, 2012, entitled "High Pressure Water Electrolysis System and Method for Activating Same." The contents of this application are incorporated herein by reference in their entirety.

BACKGROUND OF THE INVENTION

1. Field of the Invention

The present disclosure relates to a high pressure water electrolysis system and a method for activating the high pressure water electrolysis system.

2. Discussion of the Background

In general, hydrogen is used as a fuel gas used for electricity generating reaction of fuel cells. The hydrogen is produced, for example, by a water electrolysis unit. The water electrolysis unit employs a solid polymer electrolyte membrane (ion-exchange membrane) for decomposing water to generate hydrogen (and oxygen). Electrode catalyst layers are provided on both sides of the solid polymer electrolyte membrane to form an electrolyte membrane electrode assembly, and power feeders are disposed on both sides of the electrolyte membrane electrode assembly to form a unit cell.

A plurality of unit cells are stacked to form a cell unit. A voltage is applied to both ends of the cell unit in the stacking direction, and water is supplied to the anode-side power feeders. On the anode side of each electrolyte membrane electrode assembly, the water is decomposed to generate hydrogen ions (protons). The hydrogen ions move through the solid polymer electrolyte membrane to the cathode side, and combine with electrons to produce hydrogen. On the anode side, oxygen generated together with the hydrogen is discharged together with surplus water from the cell unit.

In order to generate high pressure hydrogen at several tens of MPa in this type of water electrolysis system, for example, a method and apparatus for producing high pressure hydrogen disclosed in Japanese Unexamined Patent Application Publication No. 2007-100204 is known. Japanese Unexamined Patent Application Publication No. 2007-100204 is characterized in that hydrogen obtained at the cathode by electrolysis of pure water using an electrolysis cell is taken out of the reaction system while maintaining the pressure of the hydrogen at a predetermined pressure or higher.

In a water electrolysis system generating high pressure hydrogen, when stopping the water electrolysis system, the high pressure hydrogen line in the water electrolysis unit (electrolysis cell) needs to be returned to the normal pressure (atmospheric pressure). The reason is that if the solid polymer electrolyte membrane is always subjected to the pressure difference, the solid polymer electrolyte membrane is easily damaged.

So, actually, a pressure release line is provided on the downstream side of the water electrolysis unit, and a pressure reducing valve and an on-off valve (solenoid valve) are disposed in the pressure release line. The pressure reducing valve is preferably inexpensive and compact. Usually, a pressure reducing valve having a free valve structure in which a pin member is pressed against a seat is used.

SUMMARY OF THE INVENTION

According to one aspect of the present invention, a high pressure water electrolysis system includes a high pressure water electrolysis device, a hydrogen storage device, a high pressure hydrogen pipe, a branch pipe, a non-return valve, a pressure detector, and a controller. The high pressure water electrolysis device is to electrolyze supplied water to generate oxygen and hydrogen having a pressure higher than a pressure of the oxygen. The hydrogen storage device is to store the hydrogen led out from the high pressure water electrolysis device. The high pressure hydrogen pipe connects the high pressure water electrolysis device and the hydrogen storage device. The branch pipe branches from the high pressure hydrogen pipe. A pressure reducing valve and a solenoid valve are arranged in the branch pipe in this order in series along a flow direction of the hydrogen. The non-return valve is provided in the high pressure hydrogen pipe at a position downstream of the branch pipe. The pressure detector is configured to detect a secondary side pressure of the pressure reducing valve. The controller includes a threshold storage device, a threshold determination device, and a solenoid valve opening/closing operation device. The threshold storage device is configured to store a first threshold of a pressure value detected by the pressure detector and a second threshold lower than the first threshold. At the first threshold, it is determined that an abnormality has occurred in the pressure reducing valve. At the second threshold, it is determined that a recoverable seal failure has occurred in the pressure reducing valve. The threshold determination device is configured to determine whether or not the pressure value detected by the pressure detector has reached the second threshold. The solenoid valve opening/closing operation device is configured to open and close the solenoid valve if it is determined that the pressure value detected by the pressure detector has reached the second threshold.

According to another aspect of the present invention, in a method for activating a high pressure water electrolysis system, it is determined whether or not a pressure value detected by a pressure detector configured to detect a secondary side pressure of a pressure reducing valve has reached a second threshold at which it is determined that a recoverable seal failure has occurred in the pressure reducing valve arranged in a branch pipe which branches from a high pressure hydrogen pipe connecting a high pressure water electrolysis device to a hydrogen storage device. The second threshold is lower than a first threshold at which it is determined that an abnormality has occurred in the pressure reducing valve. The high pressure water electrolysis device is to electrolyze supplied water to generate oxygen and hydrogen having a pressure higher than a pressure of the oxygen. The hydrogen storage device is to store the hydrogen led out from the high pressure water electrolysis device. The pressure reducing valve and a solenoid valve are arranged in the branch pipe in this order in series along a flow direction of hydrogen. The solenoid valve is opened and closed if it is determined that the pressure value detected by the pressure detector has reached the second threshold.

BRIEF DESCRIPTION OF THE DRAWINGS

A more complete appreciation of the invention and many of the attendant advantages thereof will be readily obtained as the same becomes better understood by reference to the fol

DESCRIPTION OF THE EMBODIMENTS

The embodiments will now be described with reference to the accompanying drawings, wherein like reference numerals designate corresponding or identical elements throughout the various drawings.

Figure 1:
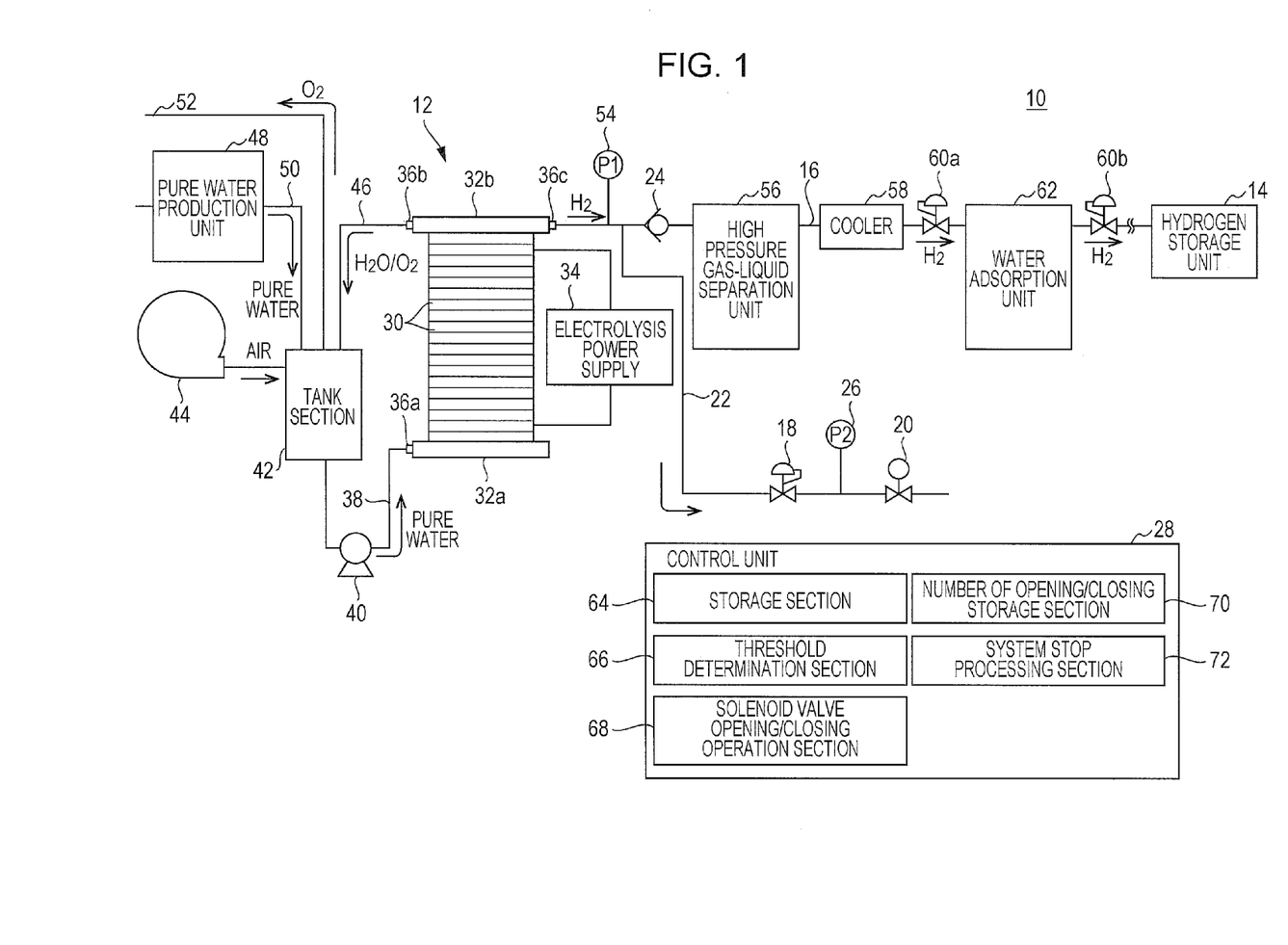
- FIG. 1 is a schematic configuration diagram illustrating a high pressure water electrolysis system according to an embodiment of the present disclosure.

As shown in FIG. 1, a high pressure water electrolysis system 10 according to the present disclosure includes a high pressure water electrolysis unit (differential pressure type water electrolysis unit) 12 that electrolyzes water (pure water) to produce oxygen and high pressure hydrogen (hydrogen at a pressure higher than that of oxygen at normal pressure, for example, 1 MPa to 70 MPa), a hydrogen storage unit 14 that stores the hydrogen led out from the high pressure water electrolysis unit 12, a high pressure hydrogen pipe 16 that connects the high pressure water electrolysis unit 12 and the hydrogen storage unit 14, a branch pipe 22 that branches from the high pressure hydrogen pipe 16 and in which a pressure reducing valve 18 and a solenoid valve 20 are arranged in this order in series along the pressure release direction (flow direction) at the time of reduction of pressure, a check valve (non-return valve) 24 that is provided in the high pressure hydrogen pipe 16, downstream of the branch pipe 22, a secondary side pressure sensor 26 (pressure detector) 26 that detects the secondary side pressure P2 of the pressure reducing valve 18, and a control unit (for example, ECU) 28.

The hydrogen storage unit 14 may be a storage tank that is connected to the high pressure hydrogen pipe 16 and that temporarily stores produced product hydrogen, or may be a hydrogen tank that is mounted in a fuel-cell electric vehicle (not shown) and to which the product hydrogen is directly supplied from the high pressure hydrogen pipe 16.

Instead of a check valve 24, a back pressure valve may be used as a non-return valve. The branch pipe 22 functions as a pressure release line by which the pressure of the high pressure water electrolysis unit 12 is branched off before a high pressure gas-liquid separation unit 56 (described later) and released. For example, a free valve structure is used as the pressure reducing valve 18.

The high pressure water electrolysis unit 12 includes a stack of water electrolysis cells 30 and end plates 32a and 32b disposed at both ends of the stack of water electrolysis cells 30 in the stacking direction. An electrolysis power supply 34 that is a DC power supply is connected to the high pressure water electrolysis unit 12.

A water supply pipe 36a is connected to the end plate 32a, and a water discharge pipe 36b and a hydrogen lead-out pipe 36c are connected to the end plate 32b. A circulation pipe 38 is connected to the water supply pipe 36a. The circulation pipe 38 is connected to the bottom of a tank section 42 through a circulation pump 40.

A blower 44 and one end of a return pipe 46 communicate with the upper part of the tank section 42, and the other end of the return pipe 46 communicates with the water discharge pipe 36b of the high pressure water electrolysis unit 12. A pure water supply pipe 50 connected to a pure water production unit 48, and an oxygen discharge pipe 52 for discharging oxygen separated from pure water in the tank section 42 are connected to the tank section 42.

The high pressure hydrogen pipe 16 is connected to the hydrogen lead-out pipe 36c of the high pressure water electrolysis unit 12. A primary side pressure sensor 54 is disposed in the high pressure hydrogen pipe 16, upstream of the branch pipe 22. A high pressure gas-liquid separation unit 56, a cooler 58, a first back pressure valve 60a, a water adsorption unit 62, and a second back pressure valve 60b are disposed in the high pressure hydrogen pipe 16, downstream of the check valve 24. The water adsorption unit 62 has an adsorption column (not shown) filled with moisture adsorbent that adsorbs water vapor (moisture) contained in hydrogen by physical adsorption action and that is renewed by releasing moisture to the outside.

The control unit 28 has functions as a storage section 64, a threshold determination section 66, a solenoid valve opening/closing operation section 68, a number-of-opening/closing storage section 70, and a system stop processing section 72. The storage section 64 stores a first threshold of the pressure value detected by the secondary side pressure sensor 26 at which it is determined that an abnormality has occurred in the pressure reducing valve 18, and a second threshold lower than the first threshold at which it is determined that a recoverable seal failure has occurred in the pressure reducing valve 18.

The threshold determination section 66 determines whether or not the detected pressure value has reached the second threshold. The solenoid valve opening/closing operation section 68 opens and closes the solenoid valve 20 if it is determined by the threshold determination section 66 that the detected pressure value has reached the second threshold. The number-of-opening/closing storage section 70 stores the number of opening/closing of the solenoid valve 20 by the solenoid valve opening/closing operation section 68. The system stop processing section 72 performs system stop processing if the stored number has reached a predetermined number or more within a predetermined time.

The operation of the high pressure water electrolysis system 10 configured as above will be described below in connection with an activation method according to the first embodiment.

Figure 2:
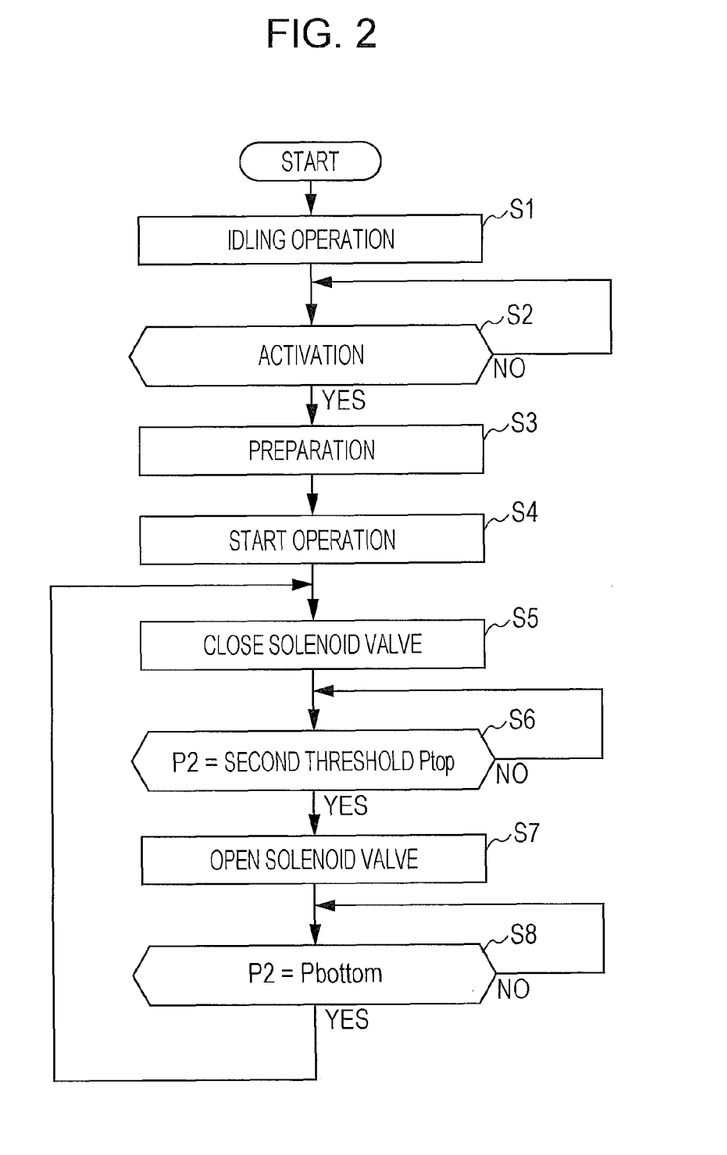
FIG. 2 is a flowchart illustrating an activating method according to a first embodiment of the present disclosure.

First, as shown in FIG. 2, the high pressure water electrolysis system 10 is performing idling operation (minimal operation necessary for activation) (step S1). If the start of activation of the high pressure water electrolysis system 10 is determined (YES in step S2), the process advances to a preparation step of step S3. In step S3, for example, pure water generated from city water by the pure water production unit 48 is supplied to the tank section 42. The process advances to step S4, where electrolysis operation by the high pressure water electrolysis system 10 is started.

As shown in FIG. 1, under the action of the circulation pump 40, the pure water in the tank section 42 is supplied through the circulation pipe 38 to the water supply pipe 36a of the high pressure water electrolysis unit 12. A voltage is applied to the high pressure water electrolysis unit 12 by the electrolysis power supply 34 electrically connected to the high pressure water electrolysis unit 12.

Therefore, in each water electrolysis cell 30, pure water is decomposed by electricity, and hydrogen ions, electrons, and oxygen are generated. Therefore, on the cathode side, hydrogen ions combine with electrons to produce hydrogen. The hydrogen is taken out from the hydrogen lead-out pipe 36c to the high pressure hydrogen pipe 16.

On the anode side, oxygen generated by reaction and unreacted water are flowing, and a mixture fluid thereof is discharged from the water discharge pipe 36b to the return pipe 46. The unreacted water and the oxygen are introduced into the tank section 42 and separated, and then the water is introduced through the circulation pump 40 and the circulation pipe 38 into the water supply pipe 36a. The oxygen separated from the water is discharged from the oxygen discharge pipe 52 to the outside.

The hydrogen generated in the high pressure water electrolysis unit 12 is sent through the high pressure hydrogen pipe 16 to the high pressure gas-liquid separation unit 56. In the high pressure gas-liquid separation unit 56, liquid water contained in the hydrogen is separated from the hydrogen and stored in a tank section (not shown). The hydrogen is led out to the high pressure hydrogen pipe 16, cooled by the cooler 58, and then supplied to the water adsorption unit 62.

In the water adsorption unit 62, water vapor contained in the hydrogen is adsorbed to produce dry hydrogen. The dry hydrogen is stored in the hydrogen storage unit 14. The dry hydrogen stored in the hydrogen storage unit 14 is put in a fuel-cell electric vehicle (not shown). The dry hydrogen led out to the high pressure hydrogen pipe 16 may be directly put in a fuel-cell electric vehicle (not shown).

The hydrogen generated in the high pressure water electrolysis unit 12 is introduced into the branch pipe 22 branching from the high pressure hydrogen pipe 16 as well as being sent through the high pressure hydrogen pipe 16 to the high pressure gas-liquid separation unit 56. After the start of system operation, the solenoid valve 20 is closed (step S5), and the secondary side pressure sensor 26 detects the secondary side pressure P2 of the pressure reducing valve 18. The primary side pressure sensor 54 detects the pressure of the high pressure hydrogen pipe 16, that is, the primary side pressure P1 of the pressure reducing valve 18.

Figure 3:
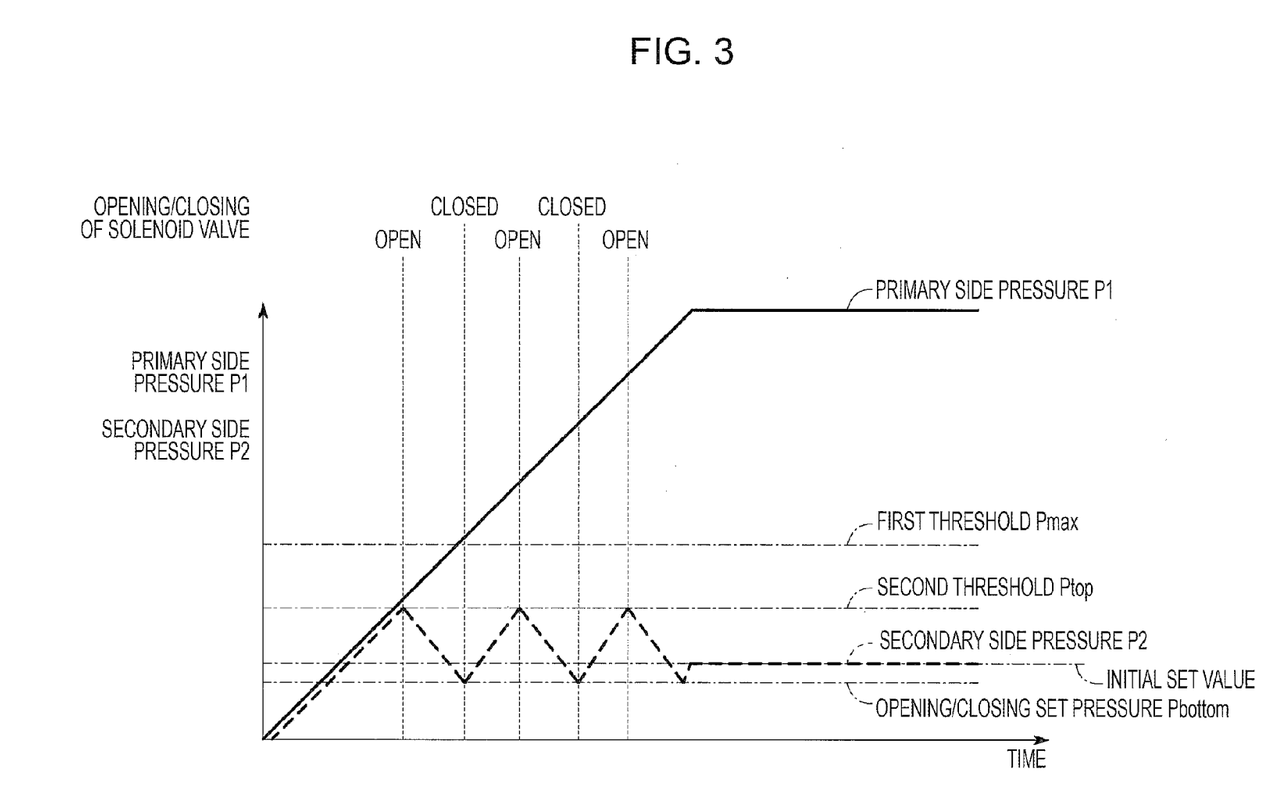
FIG. 3 is a diagram illustrating the activating method.

These detection pressures change as the electrolysis operation is continued, as shown in FIG. 3. Immediately after the start of activation, the primary side pressure P1 of the pressure reducing valve 18 is gradually raised from the normal pressure, and the secondary side pressure P2 of the pressure reducing valve 18 is raised at the same time as the primary side pressure P1. The secondary side pressure P2 continues to be raised beyond the initial set value. The reason is that in the early stage of activation, the differential pressure between the primary side pressure P1 and the secondary side pressure P2 of the pressure reducing valve 18 is small, therefore because of its structure, it is difficult for the pin member to come into close contact with the seat, and leakage occurs.

In the control unit 28, a first threshold Pmax and a second threshold Ptop are preliminarily stored in the storage section 64 (Pmax>Ptop). The secondary side pressure P2 is detected by the secondary side pressure sensor 26, and the threshold determination section 66 determines whether or not the secondary side pressure P2 has reached the second threshold Ptop. If it is determined by the threshold determination section 66 that the secondary side pressure P2 has reached the second threshold Ptop (YES in step S6), the process advances to step S7.

In step S7, the solenoid valve 20 is opened by the solenoid valve opening/closing operation section 68. Therefore, as shown in FIG. 3, the secondary side pressure P2 of the pressure reducing valve 18 is lowered. If the secondary side pressure P2 has reached the opening/closing set pressure Pbottom (YES in step S8), the process returns to step S5, where the solenoid valve 20 is closed.

While the solenoid valve 20 is opened and closed as described above, the primary side pressure P1 of the pressure reducing valve 18 is raised. Therefore, the differential pressure between the primary side pressure P1 and the secondary side pressure P2 of the pressure reducing valve 18 increases. Therefore, the pressure reducing valve 18 can recover the desired seal function, and the secondary side pressure P2 is maintained at the initial set value.

In this case, in the first embodiment, if the secondary side pressure P2 of the pressure reducing valve 18 has reached the second threshold Ptop lower than the first threshold Pmax at which it is determined that an abnormality has occurred in the pressure reducing valve 18, that is, if it is determined that a recoverable seal failure has occurred in the pressure reducing valve 18, the solenoid valve 20 is opened and closed. Therefore, the secondary side pressure P2 of the pressure reducing valve 18 lowers, and the differential pressure between the primary side pressure P1 and the secondary side pressure P2 of the pressure reducing valve 18 can be secured.

Therefore, the pressing force in the pressure reducing valve 18 increases, and the seal failure can be eliminated. Thus, the desired seal function can be recovered before an abnormality occurs in the pressure reducing valve, and the system operation can be continued. In addition, damage to the pressure reducing valve 18 itself and a device on the secondary side, for example, a solenoid valve 20 can be suppressed as much as possible.

Figure 4:
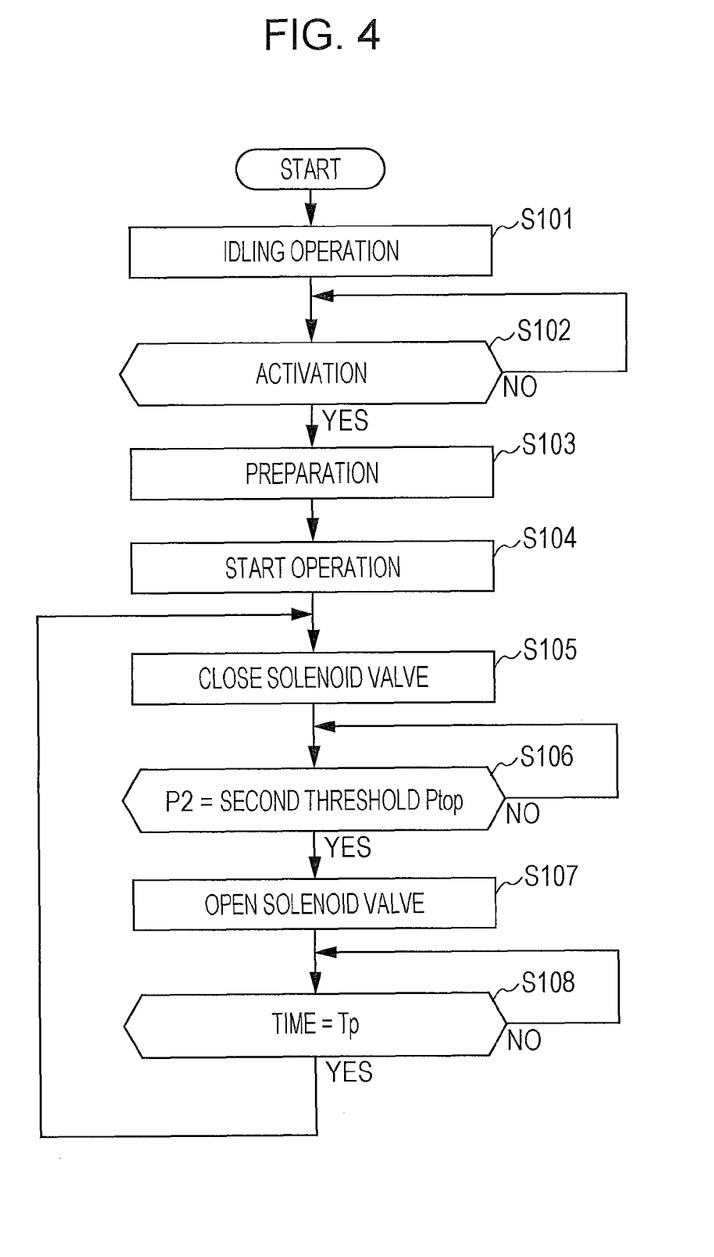
FIG. 4 is a flowchart illustrating an activating method according to a second embodiment of the present disclosure.

FIG. 4 is a flowchart illustrating an activating method according to a second embodiment of the present disclosure.

In the second embodiment, step S101 to step S107 are performed in the same manner as step S1 to step S7 of the first embodiment. After it is determined by the threshold determination section 66 that the secondary side pressure P2 has reached the second threshold Ptop, and the solenoid valve 20 is opened, the process advances to step S108.

In step S108, the timing of opening/closing of the solenoid valve 20 is determined on the basis of set time Tp. That is, timing is started when the solenoid valve 20 is opened, and when the elapsed time Time has reached the set time Tp (YES in step S108), the process returns to step S105. The set time Tp is set, actually, as shown in FIG. 3, to the time elapsed until the secondary side pressure P2 has reached the opening/closing set pressure Pbottom.

Thus, in the second embodiment, the desired seal function can be recovered before an abnormality occurs in the pressure reducing valve 18, and the system operation can be continued as in the first embodiment.

Figure 5:
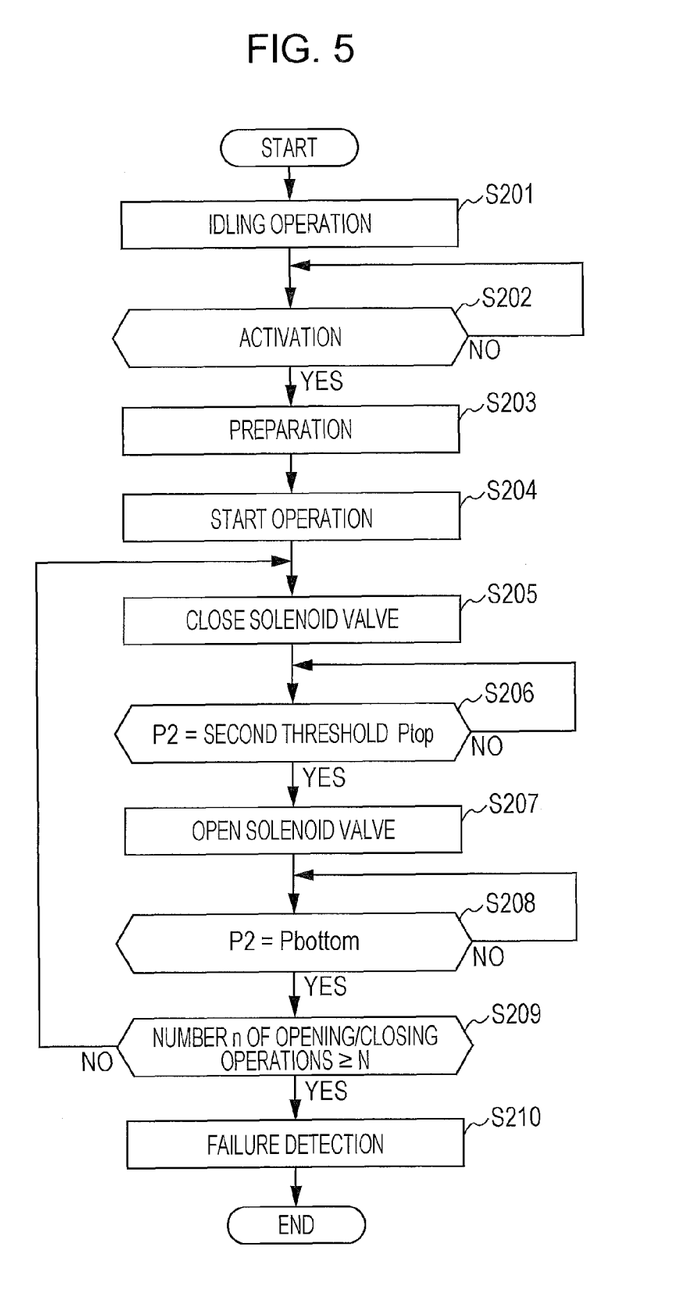
FIG. 5 is a flowchart illustrating an activating method according to a third embodiment of the present disclosure.

FIG. 5 is a flowchart illustrating an activating method according to a third embodiment of the present disclosure.

In the third embodiment, step S201 to step S208 are performed in the same manner as step S1 to step S8 of the first embodiment. If the secondary side pressure P2 has reached the opening/closing set pressure Pbottom (YES in step S208), the process advances to step S209.

In step S209, it is determined whether or not the number (n) of opening/closing operations of the solenoid valve 20 is greater than or equal to a set number (N). The set number (N) is a value preliminarily determined by experiment or the like. If the set number (N) is reached, it is determined that a failure has occurred in the pressure reducing valve 18. If the number (n) of opening/closing operations is greater than or equal to the set number (N) (YES in step S209), the process advances to step S210, where a failure is detected.

Therefore, in the third embodiment, a failure of the pressure reducing valve 18 can be detected before the secondary side pressure P2 of the pressure reducing valve 18 has reached the first threshold Pmax. In addition, the desired seal function can be recovered before an abnormality occurs in the pressure reducing valve 18, and the system operation can be continued as in the first and second embodiments.

The high pressure water electrolysis system according to the embodiment including a high pressure water electrolysis unit that electrolyzes supplied water to generate oxygen and hydrogen at a pressure higher than the pressure of the oxygen, a hydrogen storage unit that stores the hydrogen led out from the high pressure water electrolysis unit, a high pressure hydrogen pipe that connects the high pressure water electrolysis unit and the hydrogen storage unit, a branch pipe that branches from the high pressure hydrogen pipe and in which a pressure reducing valve and a solenoid valve are arranged in this order in series along the flow direction, a non-return valve that is provided in the high pressure hydrogen pipe, downstream of the branch pipe, a pressure detecting unit that detects the secondary side pressure of the pressure reducing valve, and a control unit, and a method for activating the system.

In this high pressure water electrolysis system according to the embodiment, the control unit includes a storage section that stores a first threshold of the pressure value detected by the pressure detecting unit at which it is determined that an abnormality has occurred in the pressure reducing valve, and a second threshold lower than the first threshold at which it is determined that a recoverable seal failure has occurred in the pressure reducing valve, a threshold determination section that determines whether or not the detected pressure value has reached the second threshold, and a solenoid valve opening/closing operation section that opens and closes the solenoid valve if it is determined that the detected pressure value has reached the second threshold.

It is preferable that, in this high pressure water electrolysis system according to the embodiment, the control unit further include a number of opening/closing storage section that stores the number of opening/closing of the solenoid valve by the solenoid valve opening/closing operation section, and a system stop processing section that performs system stop processing if the stored number has reached a predetermined number or more within a predetermined time.

This activating method according to the embodiment includes the steps of determining whether or not the pressure value detected by the pressure detecting unit has reached a second threshold at which it is determined that a recoverable seal failure has occurred in the pressure reducing valve and that is lower than a first threshold at which it is determined that an abnormality has occurred in the pressure reducing valve, and opening and closing the solenoid valve if it is determined that the detected pressure value has reached the second threshold.

It is preferable that this activating method according to the embodiment further include the steps of storing the number of opening/closing of the solenoid valve, and performing system stop processing if the stored number has reached a predetermined number or more within a predetermined time.

According to the embodiment, if the secondary side pressure of the pressure reducing valve has reached the second threshold lower than the first threshold at which it is determined that an abnormality has occurred in the pressure reducing valve, that is, if it is determined that a recoverable seal failure has occurred in the pressure reducing valve, the solenoid valve is opened and closed. Therefore, the secondary side pressure of the pressure reducing valve lowers, and the differential pressure between the primary side pressure and the secondary side pressure of the pressure reducing valve can be secured. The recoverable seal failure means, for example, a state where the pin member (valve body) forming the pressure reducing valve is broken or deformed, and leakage cannot be prevented just by bringing the pin member into contact with the seat, and a case where, when there is a differential pressure higher or equal to a predetermined pressure, the pin member comes into close contact with the seat and the seal function can be fulfilled.

Therefore, by securing the desired differential pressure, the pressing force in the pressure reducing valve increases, and the seal failure can be eliminated. Thus, the desired seal function can be recovered before an abnormality occurs in the pressure reducing valve, and the system operation can be continued. In addition, damage to the pressure reducing valve itself and a device on the secondary side can be suppressed as much as possible.

Obviously, numerous modifications and variations of the present invention are possible in light of the above teachings. It is therefore to be understood that within the scope of the appended claims, the invention may be practiced otherwise than as specifically described herein.

What is claimed is:

1. A high pressure water electrolysis system comprising:
    a high pressure water electrolysis device to electrolyze supplied water to generate oxygen and hydrogen having a pressure higher than a pressure of the oxygen;
    a hydrogen storage device to store the hydrogen led out from the high pressure water electrolysis device;
    a high pressure hydrogen pipe that connects the high pressure water electrolysis device and the hydrogen storage device;
    a branch pipe which branches from the high pressure hydrogen pipe and in which a pressure reducing valve and a solenoid valve are arranged in this order in series along a flow direction of the hydrogen;
    a non-return valve that is provided in the high pressure hydrogen pipe at a position downstream of the branch pipe;
    a pressure detector configured to detect a secondary side pressure of the pressure reducing valve; and
    a controller comprising:
        a threshold storage device configured to store
            a first threshold of a pressure value detected by the pressure detector at which it is determined that an abnormality has occurred in the pressure reducing valve, and
            a second threshold lower than the first threshold at which it is determined that a recoverable seal failure has occurred in the pressure reducing valve;
        a threshold determination device configured to determine whether or not the pressure value detected by the pressure detector has reached the second threshold; and
        a solenoid valve opening/closing operation device configured to open and close the solenoid valve if it is determined that the pressure value detected by the pressure detector has reached the second threshold.

2. The high pressure water electrolysis system according to claim 1, wherein the controller further comprises
    a number-of-opening/closing storage device configured to store a number of opening/closing of the solenoid valve by the solenoid valve opening/closing operation device, and
    a system stop processing device configured to perform system stop processing if the number stored in the number-of-opening/closing storage device has reached a predetermined number or more within a predetermined time.

3. The high pressure water electrolysis system according to claim 1, wherein the solenoid valve opening/closing operation device is configured to open the solenoid valve if it is determined that the pressure value detected by the pressure detector has reached the second threshold, and wherein the solenoid valve opening/closing operation device is configured to close the solenoid valve if the pressure value detected by the pressure detector has reached an opening/closing set pressure lower than the second threshold.

4. A method for activating a high pressure water electrolysis system, comprising:

determining whether or not a pressure value detected by a pressure detector configured to detect a secondary side pressure of a pressure reducing valve has reached a second threshold at which it is determined that a recoverable seal failure has occurred in the pressure reducing valve arranged in a branch pipe which branches from a high pressure hydrogen pipe connecting a high pressure water electrolysis device to a hydrogen storage device, the second threshold being lower than a first threshold at which it is determined that an abnormality has occurred in the pressure reducing valve, the high pressure water electrolysis device being to electrolyze supplied water to generate oxygen and hydrogen having a pressure higher than a pressure of the oxygen, the hydrogen storage device being to store the hydrogen led out from the high pressure water electrolysis device, the pressure reducing valve and a solenoid valve being arranged in the branch pipe in this order in series along a flow direction of hydrogen; and opening and closing the solenoid valve if it is determined that the pressure value detected by the pressure detector has reached the second threshold.

5. The method according to claim 4, further comprising:
storing a number of opening/closing of the solenoid valve; and performing system stop processing if the number stored in the storing of the number of opening/closing has reached a predetermined number or more within a predetermined time.

6. The method according to claim 4, wherein a non-return valve is provided in the high pressure hydrogen pipe at a position downstream of the branch pipe.

7. The method according to claim 4, wherein the opening and closing of the solenoid valve includes opening the solenoid valve if it is determined that the pressure value detected by the pressure detector has reached the second threshold, and wherein the opening and closing of the solenoid valve includes closing the solenoid valve if the pressure value detected by the pressure detector has reached an opening/closing set pressure lower than the second threshold.

8. A high pressure water electrolysis system comprising:

a high pressure water electrolysis device to electrolyze supplied water to generate oxygen and hydrogen having a pressure higher than a pressure of the oxygen;

a hydrogen storage device to store the hydrogen led out from the high pressure water electrolysis device;

a high pressure hydrogen pipe that connects the high pressure water electrolysis device and the hydrogen storage device;

a branch pipe which branches from the high pressure hydrogen pipe and in which a pressure reducing valve and a solenoid valve are arranged in this order in series along a flow direction of the hydrogen;

a non-return valve that is provided in the high pressure hydrogen pipe at a position downstream of the branch pipe;

a pressure detector configured to detect a secondary side pressure of the pressure reducing valve;

threshold storage means for storing
a first threshold of a pressure value detected by the pressure detector at which it is determined that an abnormality has occurred in the pressure reducing valve, and
a second threshold lower than the first threshold at which it is determined that a recoverable seal failure has occurred in the pressure reducing valve;

threshold determination means for determining whether or not the pressure value detected by the pressure detector has reached the second threshold; and solenoid valve opening/closing operation means for opening and closing the solenoid valve if it is determined that the pressure value detected by the pressure detector has reached the second threshold.

* * * * *